United States Patent
Jenkins et al.

(10) Patent No.: US 9,189,019 B2
(45) Date of Patent: Nov. 17, 2015

(54) SUPPORT COMPONENT FOR AN APPARATUS

(71) Applicant: Microsoft Corporation, Redmond, WA (US)

(72) Inventors: Kurt Allen Jenkins, Sammamish, WA (US); Brett Andrew Tomky, Seattle, WA (US); Timothy Jerome Coomes, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 13/946,576

(22) Filed: Jul. 19, 2013

(65) Prior Publication Data

US 2015/0022961 A1    Jan. 22, 2015

(51) Int. Cl.
*G06F 1/16* (2006.01)

(52) U.S. Cl.
CPC .............. *G06F 1/1616* (2013.01); *G06F 1/166* (2013.01)

(58) Field of Classification Search
CPC ... F16M 2200/08; F16M 11/00; F16M 11/04; H05K 5/0234; G06F 1/166
See application file for complete search history.

(56) References Cited

U.S. PATENT DOCUMENTS

| 5,507,072 A | 4/1996 | Youn |
| 8,947,867 B2 * | 2/2015 | Hsu et al. ............... 361/679.21 |
| 2004/0005184 A1 | 1/2004 | Kim et al. |
| 2004/0125552 A1 | 7/2004 | Song |
| 2005/0263660 A1 | 12/2005 | Hsiung |
| 2005/0269479 A1 | 12/2005 | Yeh et al. |
| 2008/0023599 A1 | 1/2008 | Lin |
| 2010/0096515 A1 | 4/2010 | Hazzard et al. |
| 2011/0180674 A1 | 7/2011 | Bliven et al. |
| 2012/0275025 A1 | 11/2012 | Parrill |
| 2013/0075543 A1 | 3/2013 | Krohn et al. |
| 2013/0100597 A1 | 4/2013 | Berg et al. |

OTHER PUBLICATIONS

Stumpf, James, "Levitatr: A Keyboard with Elevating Keys for iPad, Tablets", Retrieved at: <<http://www.kickstarter.com/projects/1372319351/levitatr-a-keyboard-with-elevating-keys-for-ipad-t>>, Sep. 23, 2011, pp. 10.

Phillips, Jon, "Microsoft Surface RT Tablet Review", Retrieved at: <<http://www.digitalartsonline.co.uk/reviews/interactive-design/microsoft-surface-rt-tablet/>>, Oct. 25, 2012, pp. 6.

(Continued)

*Primary Examiner* — Robert J Hoffberg
*Assistant Examiner* — Hung Dang
(74) *Attorney, Agent, or Firm* — Jeremy Snodgrass; Judy Yee; Micky Minhas

(57) ABSTRACT

A support component for an apparatus is described. In at least some implementations, a support component is attached to an apparatus (e.g., a computing device) via a hinge mechanism. The support component can serve as a "kickstand" that can be positioned via the hinge mechanism to support the apparatus in a variety of orientations relative to an adjacent surface. In at least some embodiments, a support component includes hinge mounts via which the support component is attached to hinges of an associated apparatus. The support component and associated hinge mounts, for instance, can be manufactured separately and/or via different manufacturing processes, and attached during a production process.

20 Claims, 12 Drawing Sheets

(56) References Cited

OTHER PUBLICATIONS

Palenchar, Jospeh, "Definitive to Launch First Bluetooth Speaker", Retrieved at: <<http://www.twice.com/articletype/ces/definitive-launch-first-bluetooth-speaker/104360>>, Jan. 2, 2013, pp. 3.

"International Search Report and Written Opinion Issued in PCT Patent Application No. PCT/US2014/046776", Mailed Date: Dec. 15, 2014, 10 pages.

"Second Written Opinion", Application No. PCT/US2014/046776, Jul. 6, 2015, 6 pages.

* cited by examiner

SUPPORT COMPONENT FOR AN APPARATUS

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, however, the devices are typically designed to be used in a handheld manner. Typical ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A support component for an apparatus is described. In at least some implementations, a support component is attached to an apparatus (e.g., a computing device) via a hinge mechanism. The support component can serve as a "kickstand" that can be positioned via the hinge mechanism to support the apparatus in a variety of orientations relative to an adjacent surface.

In at least some embodiments, a support component includes hinge mounts via which the support component is attached to hinges of an associated apparatus. The support component further includes mounting pockets in which the hinge mounts are attached. According to various embodiments, the mounting pockets are formed in the support component to match an exterior profile of the hinge mounts to provide a secure attachment of the hinge mounts to the support component. In at least some embodiments, a support component and associated hinge mounts can be manufactured separately and/or via different manufacturing processes, and attached during a production process.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A support component for an apparatus is described. In at least some implementations, a support component is attached to an apparatus (e.g., a computing device) via a hinge mechanism. The support component can serve as a "kickstand" that can be positioned via the hinge mechanism to support the apparatus in a variety of orientations relative to an adjacent surface.

In at least some embodiments, a support component includes hinge mounts via which the support component is attached to hinges of an associated apparatus. The support component further includes mounting pockets in which the hinge mounts are attached. According to various embodiments, the mounting pockets are formed in the support component to match an exterior profile of the hinge mounts to provide a secure attachment of the hinge mounts to the support component.

In at least some embodiments, a support component and associated hinge mounts can be manufactured separately, and attached during a production process. For instance, a support component can be formed via a first manufacturing process that is suitable to the material and profile specifications of the support component. Examples of the first manufacturing process include stamping, extrusion, chemical etching, and so forth. The hinge mounts can be manufactured by a second, different manufacturing process based on the specific material used to form the hinge mounts. Examples of the second manufacturing process include casting, machining, and so on.

After the support component and the hinge mounts are formed via their respective processes, the hinge mounts are attached within mounting pockets of the support component, such as via a suitable adhesive. The hinge mounts are then secured to hinges of an associated apparatus, such as via screws and/or other suitable fastening mechanism. The hinge mounts provide for secure attachment of the support component to an associated apparatus, and enable the support component to support the apparatus in a variety of operation positions.

In the following discussion, an example environment is first described that may employ the techniques described herein. Embodiments discussed herein are not limited to the example environment, and the example environment is not limited to embodiments discussed herein. Next, a section titled "Support Component" describes some example implementations of a support component in accordance with one or more embodiments. Following this, a section titled "Support Component Fabrication" describes example implementations for fabricating various portions of a support component in accordance with one or more embodiments. Next, a section titled "Example Procedures" describes some example methods in accordance with one or more embodiments. Finally, an example system and device are discussed that may implement various techniques described herein.

Example Environment

Figure 1:
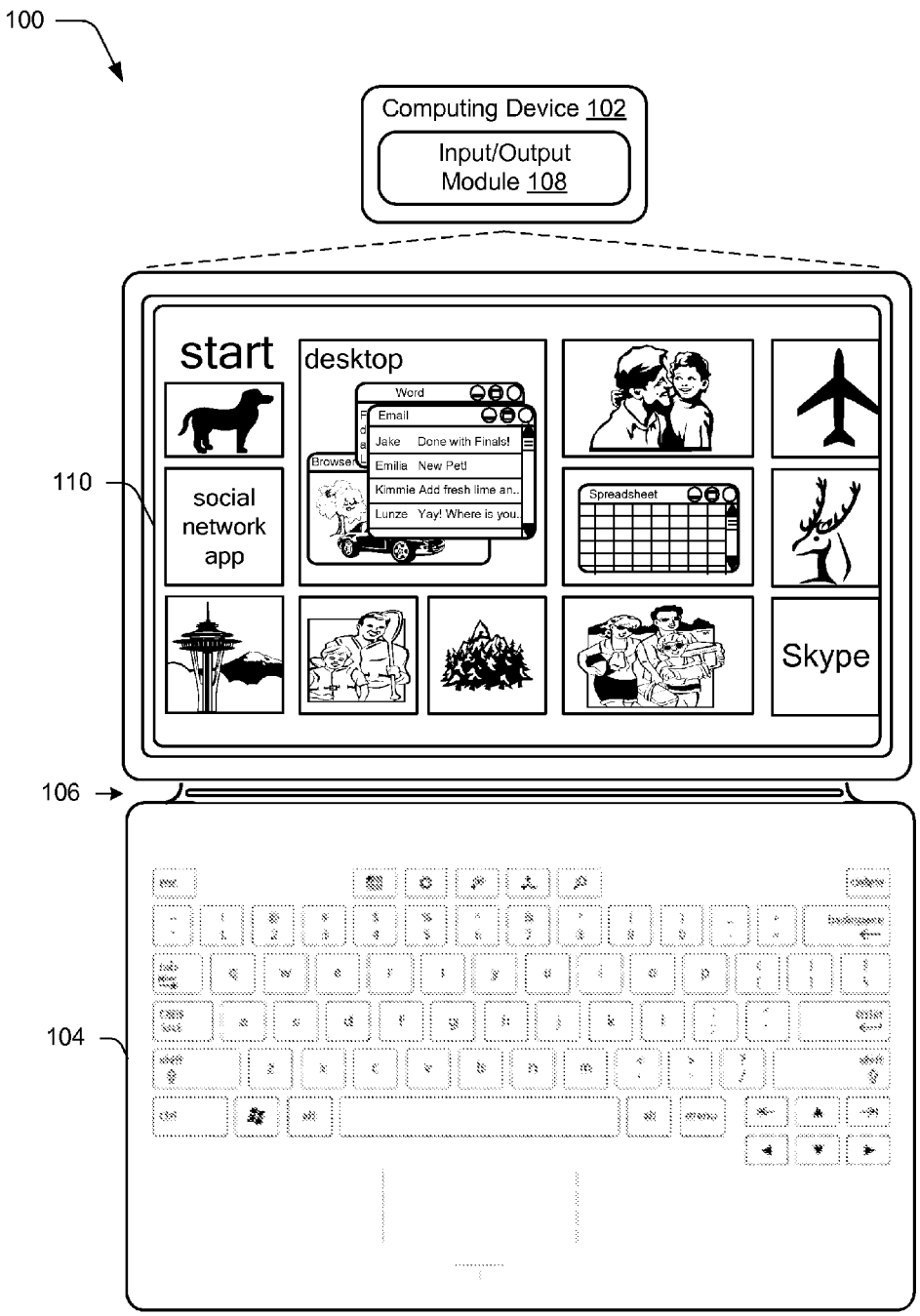
FIG. 1 is an illustration of an environment in an example implementation that is operable to employ the techniques described herein in accordance with one or more embodiments.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 is operably associated with software that causes the computing device 102 to perform one or more operations. An example implementation of the computing device 102 is discussed below with reference to FIG. 13.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

As further discussed below, the computing device 102 includes a support component that enables various operating positions for the computing device 102, such as relative to the input device 104.

Support Component

Figure 2:
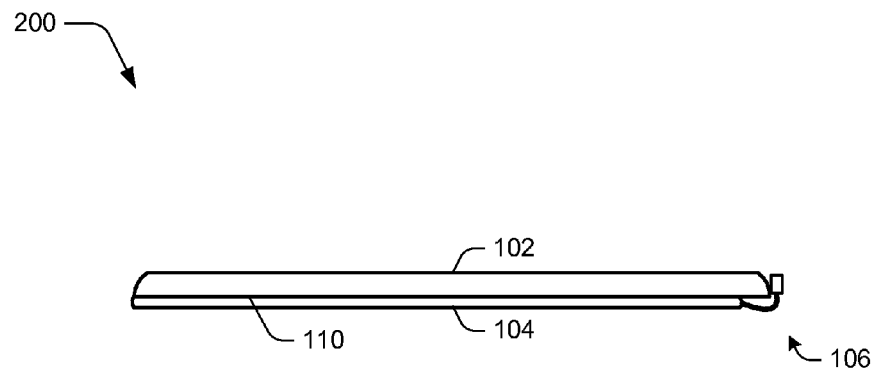
FIG. 2 depicts an example orientation of an input device in relation to a computing device in accordance with one or more embodiments.

Through rotational movement of the flexible hinge 106, a variety of different orientations of the input device 104 in relation to the computing device 102 may be supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
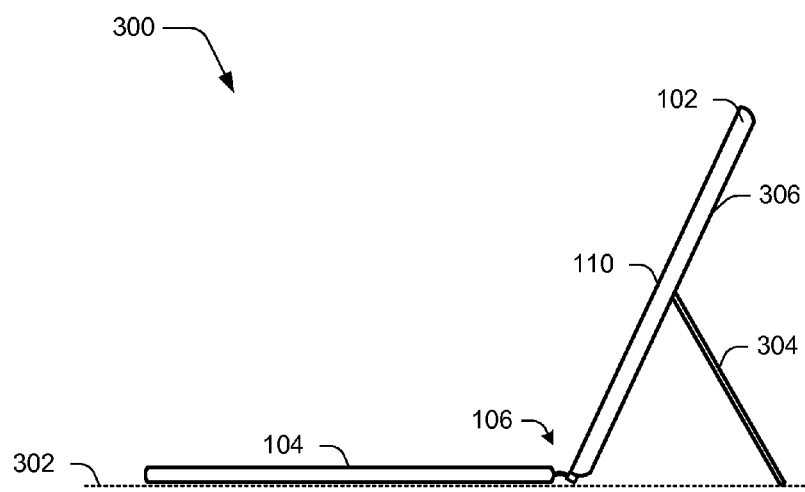
FIG. 3 depicts an example orientation of an input device and a support component in relation to a computing device in accordance with one or more embodiments.

FIG. 3 illustrates a side view of an example open position 300 for the computing device 102. In the position 300, the input device 104 is laid flat against a surface 302, such as a desk, a table, and so forth. The computing device 102 is disposed at an angle to permit viewing of the display device 110 through use of a kickstand 304 disposed on a rear surface 306 of the computing device 102. Generally, the kickstand 304 is formed via a planar portion of material, such as instances and/or combinations of plastic, metal, various alloys, carbon fiber, and so forth. As detailed below, the kickstand 304 serves as a support component that can be moved to various orientations with respect to the computing device 102 to support different operating positions for the computing device 102.

Figure 4:
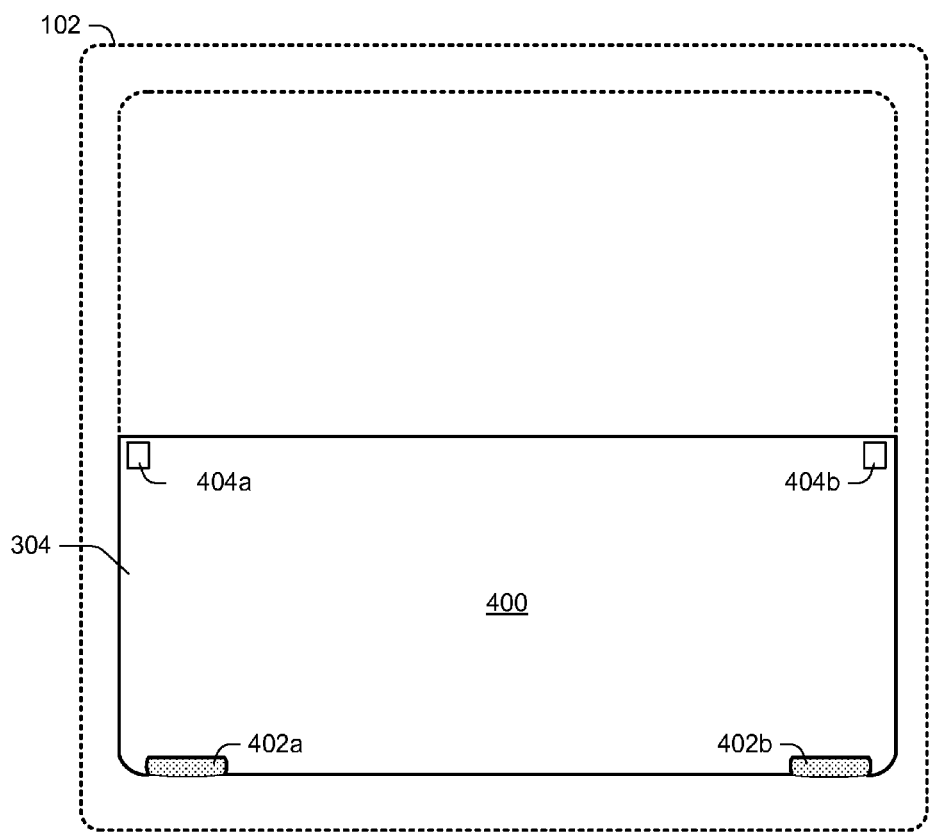
FIG. 4 depicts an example view of a support component in accordance with one or more embodiments.

FIG. 4 illustrates an inner surface 400 of the kickstand 304 in accordance with one or more embodiments. In this example, the kickstand 304 is illustrated in the context of an outline of the computing device 102.

The inner surface 400 includes surface contacts 402a and 402b, which function as surface interface points when the kickstand 304 is in an open position. The surface contacts 402a, 402b can be formed using a variety of types of slip-resistant materials, and can be positioned within a notch in the inner surface 400. For example, the surface contacts 402a, 402b can be formed from an elastic material, such as rubber, synthetic polymers, thermoplastics, and so forth. Examples of suitable materials include nylon, polypropylene, polyisoprene, and so on.

The inner surface 400 further includes hinge mounts 404a, 404b which function as mounting points for hinge mechanisms that are employed to attach the kickstand 304 to the computing device 102. Examples of suitable hinge mechanisms are discussed below. According to various embodiments, techniques discussed herein provide ways for securely attaching the hinge mounts 404a, 404b to the kickstand 304.

Figure 5:
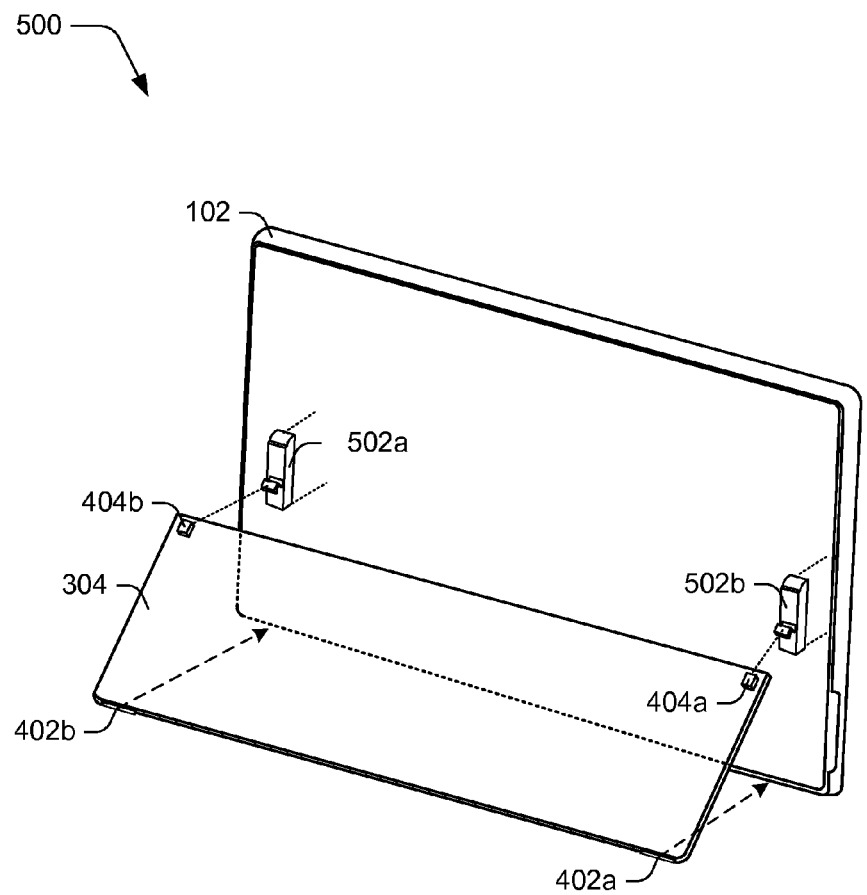
FIG. 5 depicts an example view of a support component and an associated computing device in accordance with one or more embodiments.

FIG. 5 illustrates an exploded rear view 500 of the computing device 102, including the kickstand 304. Included in the rear view 500 are hinges 502a and 502b, which can be employed to attach the kickstand 304 to the computing device 102. The hinges 502a, 502b are configured to be installed internally in the computing device 102, such as via a suitable attachment method and/or device.

The kickstand 304 can be attached to a pivoting portion of the hinges 502a, 502b via the hinge mounts 404a, 404b. Thus, attachment to the hinges 502a, 502b enables the kickstand 304 to pivot between various positions with reference to the computing device 102.

The hinges 502a, 502b are installed in the computing device 102 such that when the kickstand 304 is rotated on the hinges to a closed position, the hinges 502a, 502b are not visible and the kickstand 304 forms a smooth contour with the chassis of the computing device 102.

Also illustrated in the rear view 500 are the surface contacts 402a, 402b. As discussed above, the surface contacts 402a, 402b can stabilize the kickstand 304, and thus the computing device 102, when the kickstand 304 is in an open position and resting on a surface. In at least some embodiments, the surface contacts 402a, 402b are positioned in a groove in an inner surface of the kickstand 304 such that the surface contacts 402a, 402b are not externally visible when the kickstand 304 is in a closed position.

Support Component Fabrication

This section discusses various embodiments for fabricating a support component, and includes a number of implementation scenarios in accordance with one or more embodiments.

Figure 6:
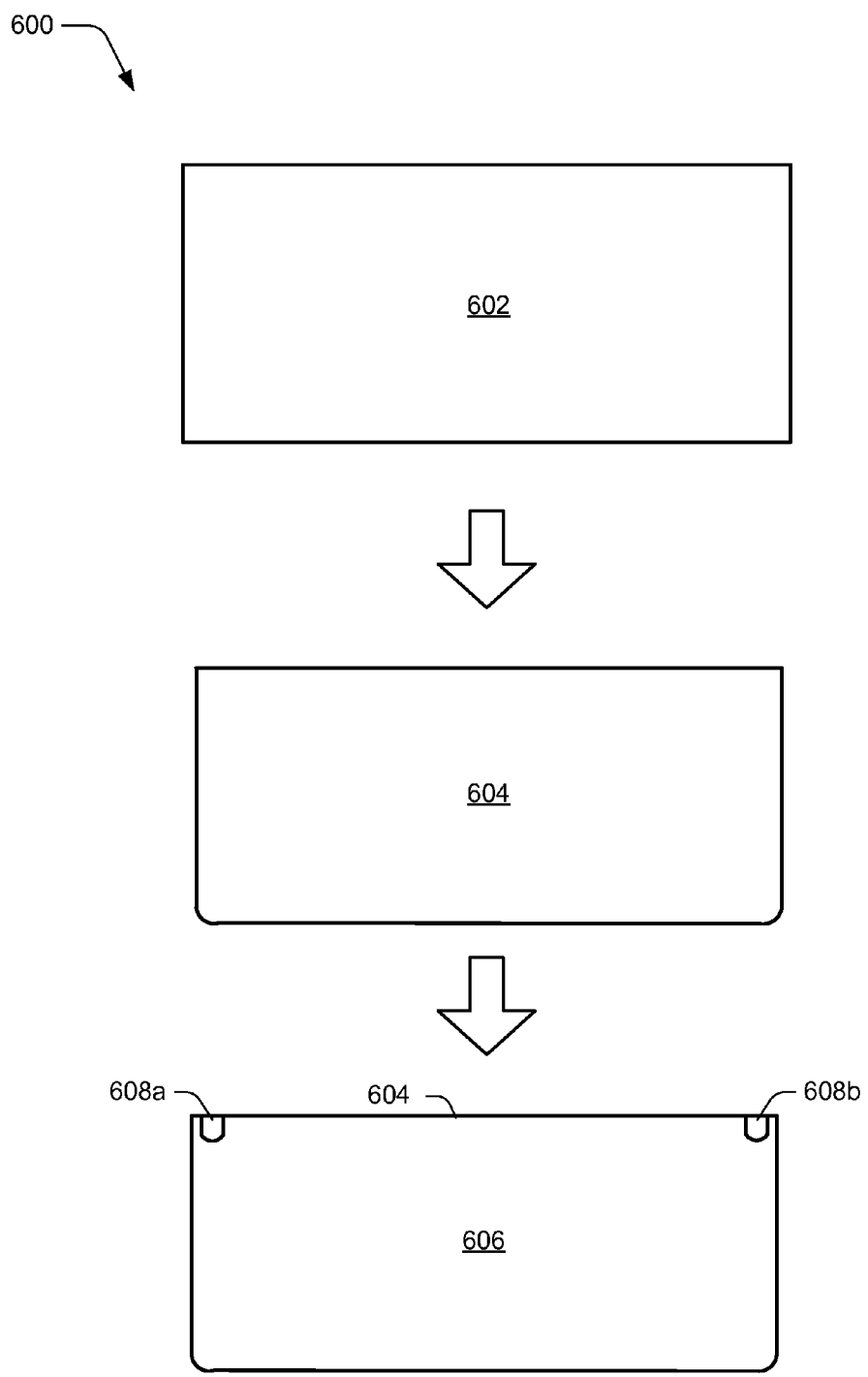
FIG. 6 depicts an example implementation scenario for fabricating a support component in accordance with one or more embodiments.

FIG. 6 illustrates an example implementation scenario 600 for fabricating a support component body in accordance with one or more embodiments. The scenario 600 starts with a production blank 602, which is representative of a portion of material that can be processed in various ways to form a support component. The production blank 602, for example, represents a portion of sheet metal stock, such as aluminum, magnesium, steel, and so forth. In at least some embodiments, the production blank 602 can be formed from a larger portion of material via various processes, such as cutting, stamping, and so on.

Proceeding to the center portion of the scenario 600, the production blank 602 is processed to generate a support component body 604. For example, portions of surfaces and/or edges of the production blank 602 can be removed via various processes to form the support component body 604. Examples of suitable processes include machining (e.g., computer numerical control (CNC) machining), stamping, chemical etching, laser ablation, and so forth. Thus, the production blank 602 can be processed to specific dimensions (e.g., width, length, and or thickness) to form the support component body 604.

Continuing to the lower portion of the scenario 600, the support component body 604 is processed to form a mounting pocket 608a and a mounting pocket 608b in a rear surface 606 of the support component body 604. According to various embodiments, the mounting pockets 608a, 608b are cavities in the rear surface 606 in which hinge mounts can be fastened. For instance, the hinge mounts 404a, 404b introduced above can be mounted into the mounting pockets 608a, 608b. The mounting pockets 608a, 608b can be formed via various techniques, such as machining, cutting, chemical etching, laser ablation, and so forth.

Although not expressly illustrated here, separate mounting pockets may also be formed in the rear surface 606 for the surface contacts 402a, 402b, discussed above.

Figure 7:
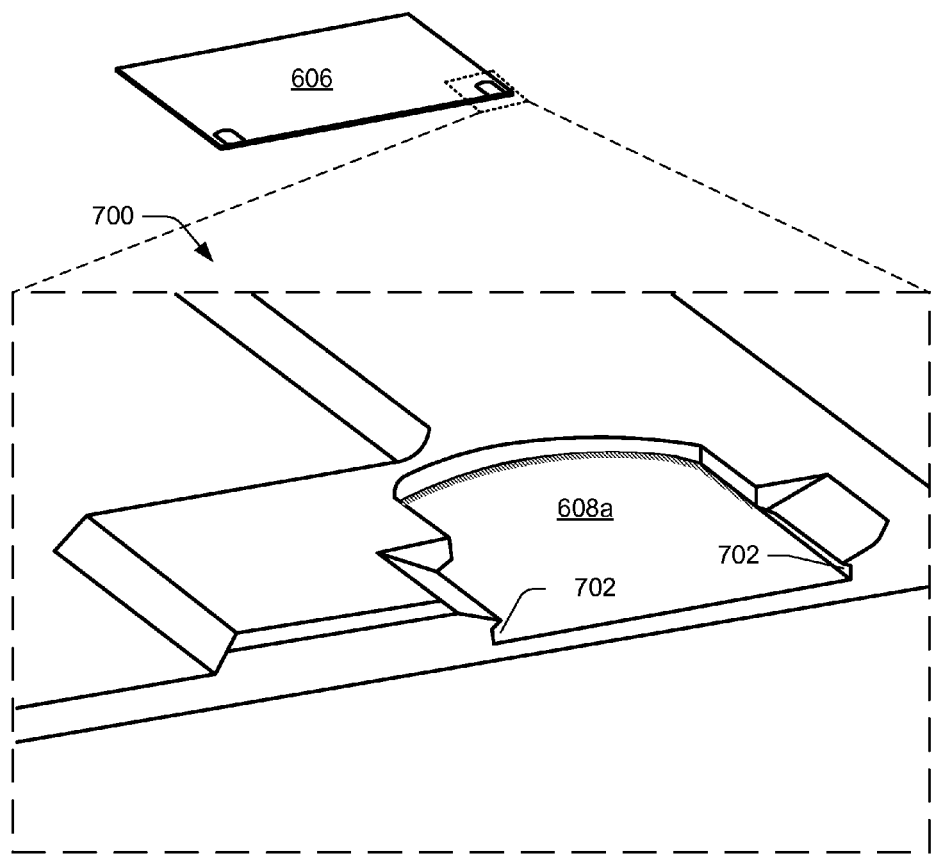
FIG. 7 depicts an example view of a portion of a support component in accordance with one or more embodiments.

FIG. 7 illustrates a zoomed view 700 of a portion of the rear surface 606 in accordance with one or more embodiments. The zoomed view 700 illustrates details of the mounting pocket 608a. The mounting pocket 608a is formed in a dovetail shape that includes an undercut channel 702 that runs along the entire lower interior perimeter of the mounting pocket 608a. As discussed below, the dovetail shape of the mounting pocket 608a and the undercut channel 702 enable a hinge mount to be securely fastened within the mounting pocket 608a.

Although not expressly illustrated here, the mounting pocket 608b discussed above can be configured in a similar fashion as the mounting pocket 608a.

Figure 8:
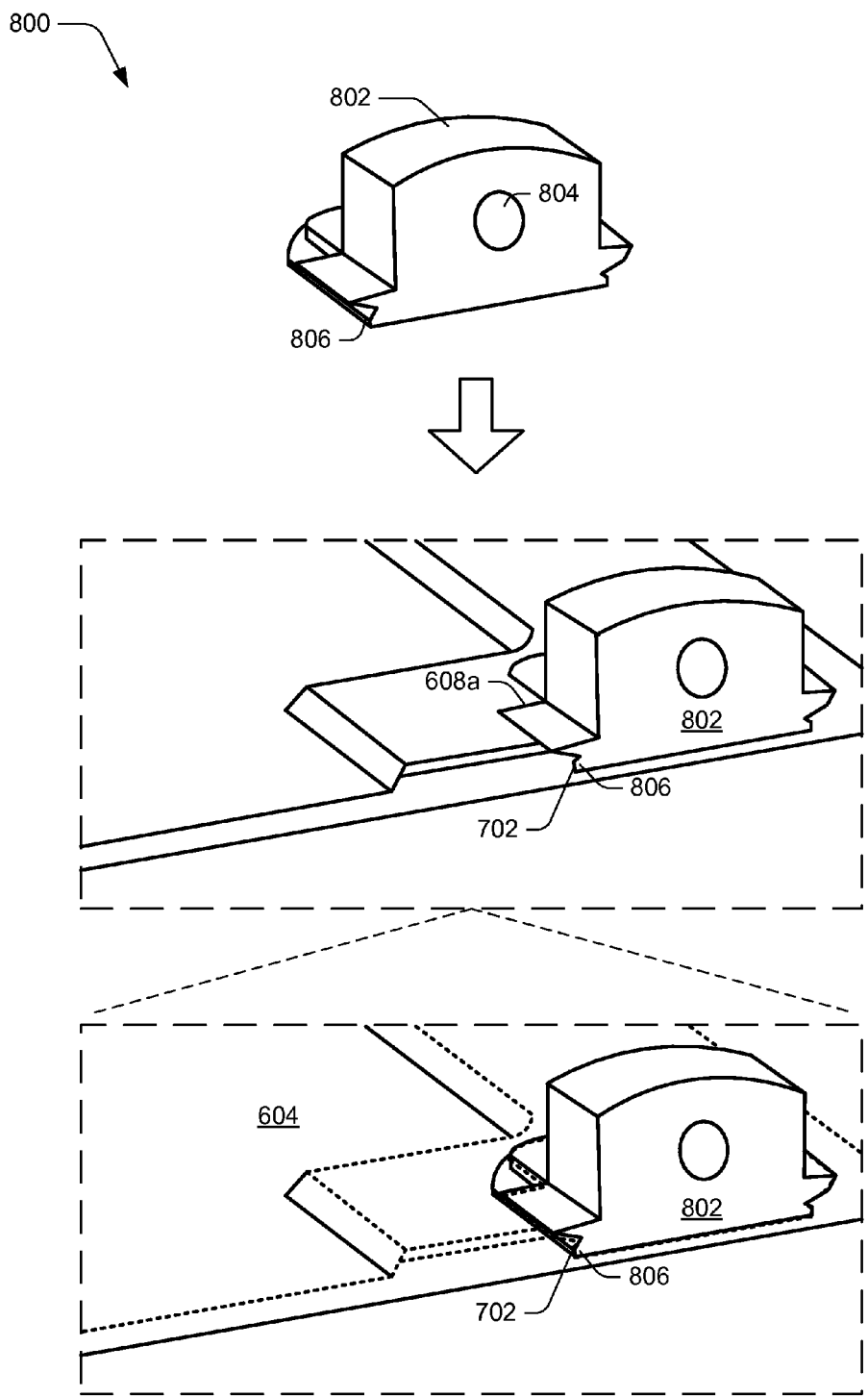
FIG. 8 depicts an example implementation scenario for attaching a hinge mount to a support component in accordance with one or more embodiments.

FIG. 8 illustrates an example implementation scenario 800 for attaching a hinge mount within the mounting pocket 608a. The upper portion of the scenario 800 includes a hinge mount 802, which represents an example embodiment of the hinge mounts 404a, 404b discussed above. The hinge mount 802 can be formed in a variety of ways and from a variety of different materials. For instance, the hinge mount 802 can be machined from a material such as steel, zinc, and so forth. A variety of other techniques may alternatively or additionally be utilized to form the hinge mount 802, such as casting, stamping, extrusion, and so forth.

The hinge mount 802 includes a fastener channel 804, which is a hollow portion that spans from front to back of the hinge mount 802 and is configured to accept a fastener such that the hinge mount 802 can be attached to a hinge. For instance, a diameter of the fastener channel 804 is wide enough such that a shank and threads of a screw can pass unabated through the fastener channel 804, but also narrow enough such that a head of the screw does not. For instance, this enables the hinge mount 802 to be fastened via a screw to a threaded portion of an associated hinge.

The hinge mount 802 further includes a base 806 that is beveled relative to other portions of the hinge mount 802. The bevel of the base 806 is such that when the hinge mount 802 is placed within the mounting pocket 608a, the outer rim of the base 806 fits tightly within the undercut channel 702.

Proceeding to the center portion of the scenario 800, the hinge mount 802 is placed within the mounting pocket 608a. For instance, the hinge mount 802 can slide into the mounting pocket 608a from an external edge of the mounting pocket 608a. In at least some embodiments, an adhesive can be applied to the mounting pocket 608a and/or the base 806 prior to the hinge mount 802 being placed into the mounting pocket 608a. Thus, the tight coupling between the base 806 and the undercut channel 702 provides a secure attachment of the hinge mount 802 to the mounting pocket 608a. An adhesive applied between the base 806 and the mounting pocket 608a can further strengthen this coupling.

The lower portion of the scenario 800 illustrates a cutaway view of a portion of the support component body 604, and shows the base 806 of the hinge mount 802 within the undercut channel 702.

With the hinge mounts fastened within their respective mounting pockets, a kickstand can then be fastened to a hinge of an associated computing device, such as illustrated above.

Figure 9:
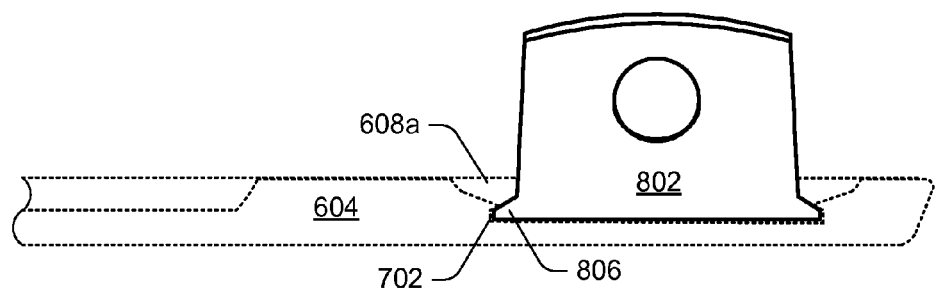
FIG. 9 depicts an example view of a support component in accordance with one or more embodiments.

FIG. 9 illustrates a side view of the support component body 604 with the hinge mount 802 attached within the mount pocket 608a. The support component body 604 is illustrated is dashed lines, and the hinge mount 802 is illustrated in solid lines. As illustrated, the dimensions of the base 806 are such that the base 806 fits tightly within the undercut channel 702, thus providing a secure coupling between the hinge mount 802 and the support component body 604.

While a number of example device orientations and positions are discussed herein, it is to be appreciated that a variety of other orientations and positions not expressly illustrated or discussed are also supported in accordance with various embodiments. Further, the illustrated placement positions for the mounting pockets 608a, 608b and the hinge mount 802 are presented for purpose of example only, and the mounting pockets 608*a*, 608*b* and the hinge mount 802 can be placed in a variety of different positions in accordance with various embodiments.

Having discussed some example implementation scenarios for support component fabrication, consider now some example procedures in accordance with one or more embodiments.

Example Procedures

The following discussion describes some example procedures for a support component for an apparatus in accordance with one or more embodiments. The example procedures may be employed in the environment 100 of FIG. 1, the system 1300 of FIG. 13, and/or any other suitable environment.

Figure 10:
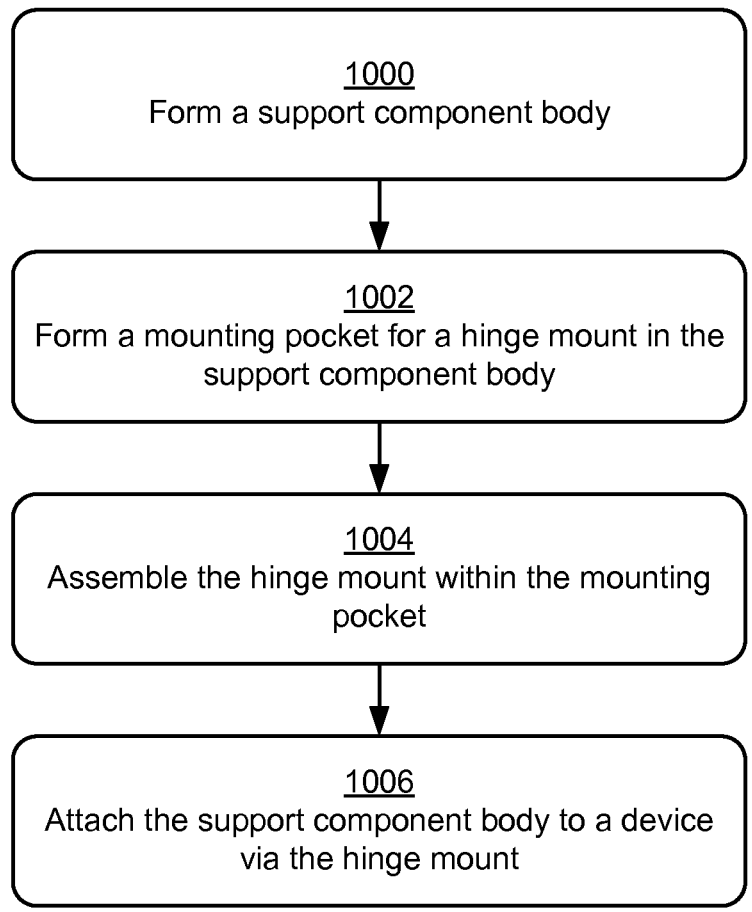
FIG. 10 is a flow diagram that describes steps in a method in accordance with one or more embodiments.

FIG. 10 is a flow diagram that describes steps in a method in accordance with one or more embodiments. The method generally describes an example implementation for support component fabrication.

Step 1000 forms a support component body. As discussed above, a support component body can be formed utilizing a variety of techniques, such as machining, stamping, chemical etching, laser ablation, and so forth. Examples of some example procedures for forming a support component body are discussed below.

Step 1002 forms a mounting pocket for a hinge mount in the support component body. Example implementations of a mounting pocket and a hinge mount are discussed above. As referenced above, a mounting pocket can be formed in a variety of ways, such as via machining, laser ablation, and so forth.

Step 1004 assembles the hinge mount within the mounting pocket. The hinge mount, for example, can slide into the mounting pocket from an external edge of the support component body. In at least some embodiments, an adhesive can be applied to the hinge mount and/or the hinge pocket prior to and/or as part of assembling the two components together.

Step 1006 attaches the support component body to a device via the hinge mount. For example, the support component can be attached to a computing device to serve as a support component for the computing device.

In at least some embodiments, the support component body and the hinge mount can be formed by different manufacturing processes prior to being assembled together. For instance, the support component body can be formed via a particular manufacturing process, such as machining, stamping, chemical etching, laser ablation, and so forth. The hinge mount can be formed by a different manufacturing process, such as die casting, extrusion, and so on. Thus, techniques discussed herein enable the support component body and the hinge mount to be formed via specific techniques that are suitable to the specific manufacturing requirements of the individual parts.

While a single hinge mount is discussed in this example method, it is to be appreciated that any suitable number of mounting pockets and hinge mounts can be employed in accordance with various embodiments.

Figure 11:
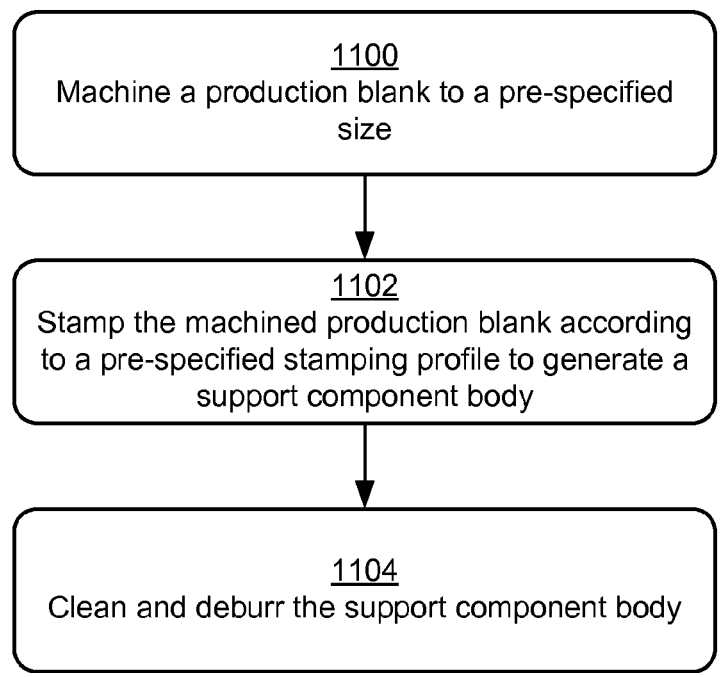
FIG. 11 is a flow diagram that describes steps in a method in accordance with one or more embodiments.

FIG. 11 is a flow diagram that describes steps in a method in accordance with one or more embodiments. The method generally describes an example implementation for forming a support component body via stamping and machining. The method, for example, represents an example implementation of step 1000 of FIG. 10, discussed above.

Step 1100 machines a production blank to a pre-specified size. Examples of a production blank are discussed above.

Step 1102 stamps the machined production blank according to a pre-specified stamping profile to generate a support component body. For instance, various types of industrial presses (e.g., a machine press, a stamping press, and so on) can be employed to stamp a production blank according to the pre-specified stamping profile.

In at least some embodiments, stamping can be implemented as a progressive stamping process whereby multiple different stamping stages are employed. For instance, different stamping stages can use different stamping tools, such as punches, forms, forming dies, and so on. Thus, multiple different stamping stages can be employed to produce the final profile of the support component body.

Step 1104 cleans and deburrs the support component body. For instance, various solvents and/or cleaners may be employed to clean the support component body. Different deburring techniques can be employed to smooth the surface of the support component body, such as mechanical deburring, electrochemical deburring, thermal deburring, and so forth.

Figure 12:
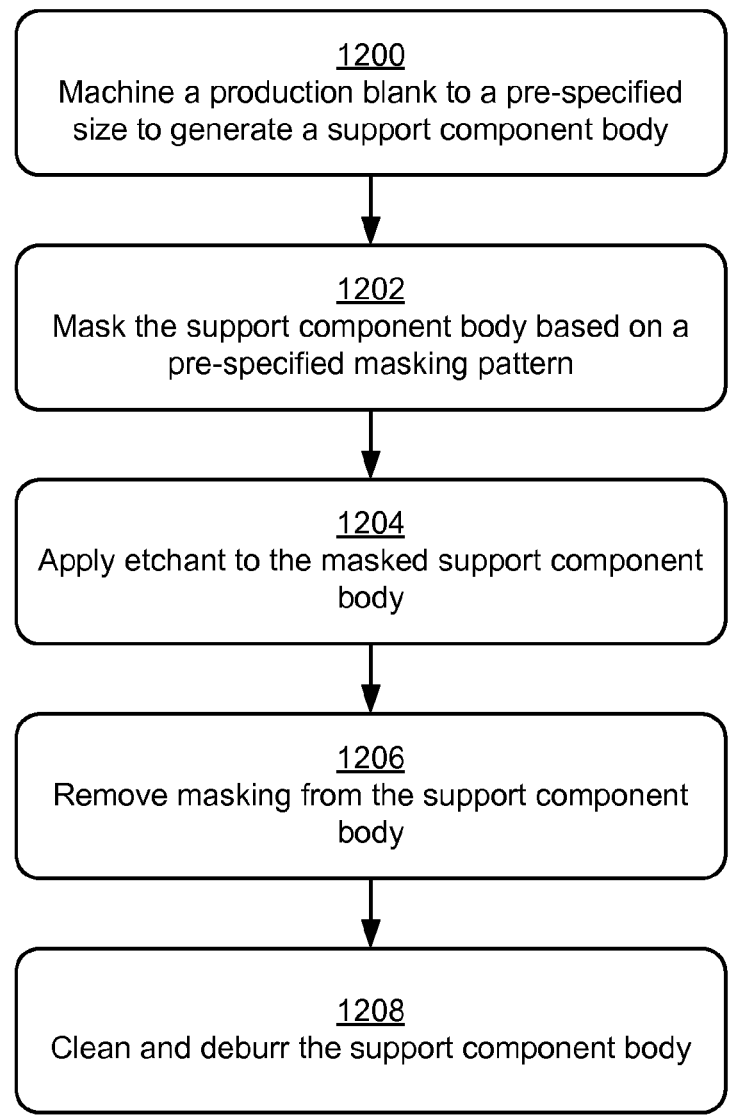
FIG. 12 is a flow diagram that describes steps in a method in accordance with one or more embodiments.

FIG. 12 is a flow diagram that describes steps in a method in accordance with one or more embodiments. The method generally describes an example implementation for forming a support component body utilizing chemical etching. The method, for example, represents an example implementation of step 1000 of FIG. 10, discussed above.

Step 1200 machines a production blank to a pre-specified size to generate a support component body. Examples of a production blank are discussed above.

Step 1202 masks the support component body based on a pre-specified masking pattern. For instance, a masking material (e.g., a stencil) can be applied to the support component body. Any suitable masking material can be employed, such as silicon nitride, silicon dioxide, liquid maskants, and so forth.

Step 1204 applies etchant to the masked support component body. The masked support component body, for example, is immersed in an etchant bath. Any suitable etchant chemical can be utilized, and is generally selected based on a material from which the original production blank is formed.

Step 1206 removes masking from the support component body.

Step 1208 cleans and deburrs the support component body. For example, the support component body can be cleaned with a solvent to remove any remaining etchant. Various types of deburring techniques can be employed to smooth the surface of the support component body, such as mechanical deburring, electrochemical deburring, thermal deburring, and so forth.

In at least some embodiments, the methods described above can be implemented as automated processes that are performed via various algorithms that are executed to control machinery to perform the different steps of the methods.

Example System and Device

Figure 13:
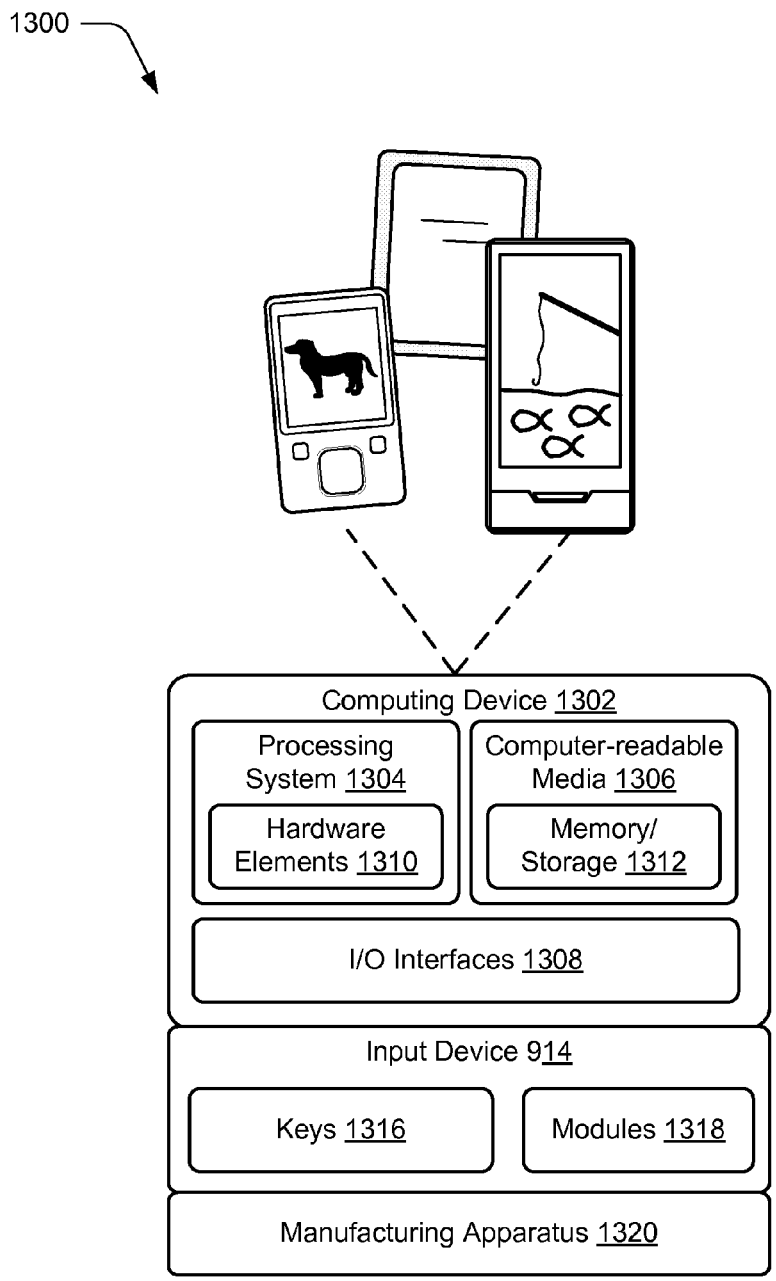
FIG. 13 illustrates an example system including various components of an example device that can be implemented as any type of computing device as described with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. The computing device 1302 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being communicatively and physically coupled to an input device 1314 that is physically and communicatively removable from the computing device 1302. In this way, a variety of different input devices may be coupled to the computing device 1302 having a wide variety of configurations to support a wide variety of functionality. In this example, the input device 1314 includes one or more keys 1316, which may be configured as pressure sensitive keys, mechanically switched keys, and so forth.

The input device 1314 is further illustrated as include one or more modules 1318 that may be configured to support a variety of functionality. The one or more modules 1318, for instance, may be configured to process analog and/or digital signals received from the keys 1316 to determine whether a keystroke was intended, determine whether an input is indicative of resting pressure, support authentication of the input device 1314 for operation with the computing device 1302, and so on.

The system 1300 further includes manufacturing apparatus 1320, which is representative of various types and/or combinations of manufacturing tools, machinery, control circuits, and so on, for implementing techniques discussed herein. Examples of the manufacturing apparatus 1320 include a stamping press, CNC mills and/or control units, etching apparatus, casting apparatus, and so forth. In at least some embodiments, the manufacturing apparatus can be controlled via portions of the computing device 102 to implement the example procedures discussed above.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein may generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
a device chassis; and
a support component attached to the device chassis and positionable in multiple positions relative to the device chassis to support one or more orientations of the device chassis relative to an adjacent surface, the support component including:
a support component body having one or more mounting pockets disposed on an edge of the support component, the one or more mounting pockets including an undercut channel within a lower portion of the one or more mounting pockets; and
one or more hinge mounts attached to the support component body within the one or more mounting pockets, a base portion of the one or more hinge mounts positioned within the undercut channel of the respective one or more mounting pockets and the one or more hinge mounts being fastened to one or more hinges of the device chassis to enable movement of the support component relative to the device chassis.

2. An apparatus as recited in claim 1, wherein the support component body is formed via a first manufacturing process, and the one or more hinge mounts are formed via a second manufacturing process different than the first manufacturing process.

3. An apparatus as recited in claim 1, wherein the support component body is formed via a stamping process, and the one or more mounting pockets are formed via machining of the support component body after the stamping process.

4. An apparatus as recited in claim 1, wherein the support component body is formed via a chemical etching process, and the one or more mounting pockets are formed via machining of the support component body after the chemical etching process.

5. An apparatus as recited in claim 1, wherein the one or more hinge mounts are formed via at least one of a casting process or a machining process.

6. An apparatus as recited in claim 1, wherein the one or more hinge mounts are attached within the one or more mounting pockets via an adhesive.

7. An apparatus as recited in claim 1, wherein the apparatus comprises a computing device, the device chassis includes a display, and the support component is configured to support different viewing positions of the display.

8. An apparatus as recited in claim 1, wherein the support component body further includes one or more surface contacts formed from a slip-resistant material and disposed along a different edge of the support component body.

9. A support component for an apparatus, comprising:
a support component body having one or more mounting pockets disposed on an edge of the support component body, the one or more mounting pockets including an undercut channel within a lower portion of the one or more mounting pockets; and
one or more hinge mounts attached to the support component body within the one or more mounting pockets, a base portion of the one or more hinge mounts positioned within the undercut channel of the respective one or more mounting pockets and the one or more hinge mounts being configured to be fastened to one or more hinges of the apparatus.

10. A support component as recited in claim 9, wherein the support component body is formed via a first manufacturing process, and the one or more hinge mounts are formed via a second manufacturing process different than the first manufacturing process.

11. A support component as recited in claim 9, wherein the support component body is formed via a stamping process, and the one or more mounting pockets are formed via machining of the support component body after the stamping process.

12. A support component as recited in claim 9, wherein the support component body is formed via a chemical etching process, and the one or more mounting pockets are formed via machining of the support component body after the chemical etching process.

13. A support component as recited in claim 9, wherein the one or more hinge mounts are formed via at least one of a casting process or a machining process.

14. A support component as recited in claim 9, wherein the one or more hinge mounts are attached within the one or more mounting pockets via an adhesive.

15. A support component as recited in claim 9, wherein the support component body further includes one or more surface contacts formed from a slip-resistant material and disposed along a different edge of the support component body.

16. An apparatus comprising:
a device chassis; and
a support component attached to the device chassis and including:
a support component body having one or more mounting pockets disposed on an edge of the support component, the one or more mounting pockets including an undercut channel within a lower portion of the one or more mounting pockets; and one or more hinge mounts attached to the support component body within the one or more mounting pockets, a base portion of the one or more hinge mounts positioned within the undercut channel of the respective one or more mounting pockets and the one or more hinge mounts being fastened to one or more hinges of the device chassis to enable movement of the support component relative to the device chassis.

17. An apparatus as recited in claim 16, wherein the one or more hinge mounts are attached within the one or more mounting pockets via an adhesive.

18. An apparatus as recited in claim 16, wherein the apparatus comprises a computing device, the device chassis includes a display, and the support component is configured to support different viewing positions of the display.

19. An apparatus as recited in claim 16, wherein the support component body further includes one or more surface contacts formed from a slip-resistant material and disposed along a different edge of the support component body.

20. An apparatus as recited in claim 16, wherein the one or more mounting pockets are formed in a dovetail shape within the support component body, and wherein the one or more hinge mounts are positioned within the dovetail.

* * * * *